United States Patent Office 2,772,373
Patented Nov. 27, 1956

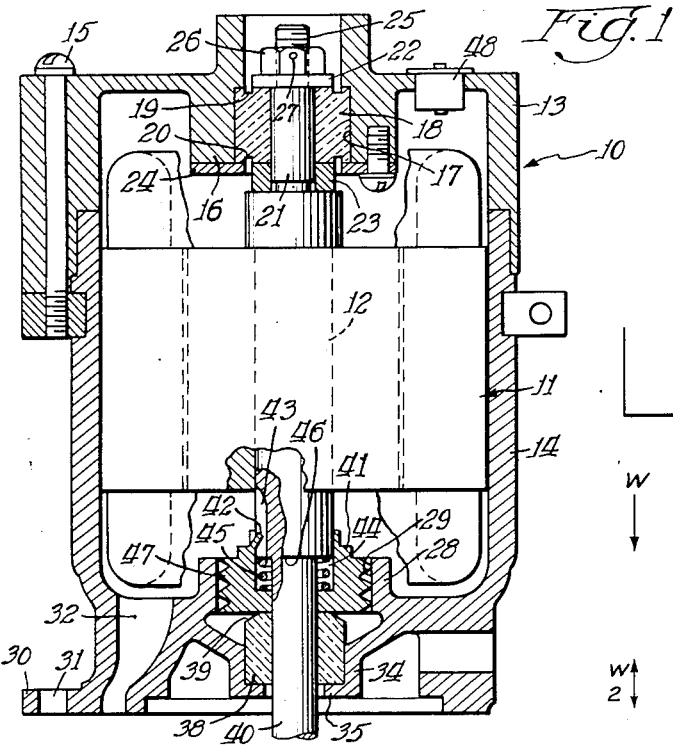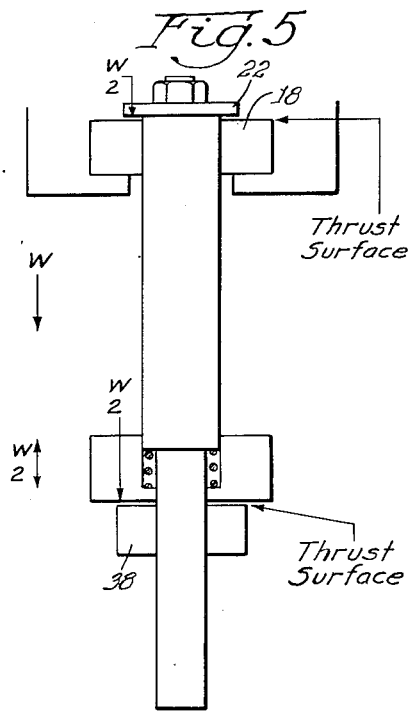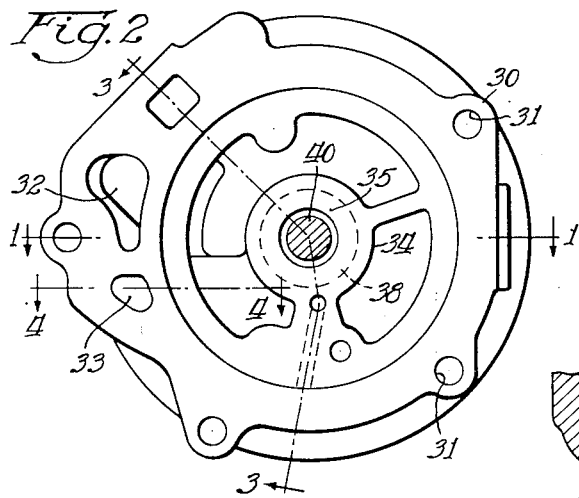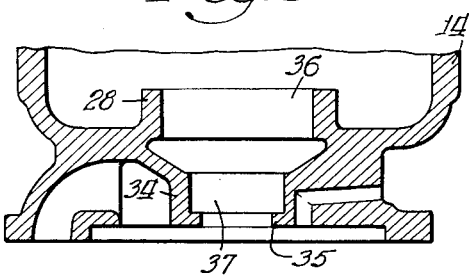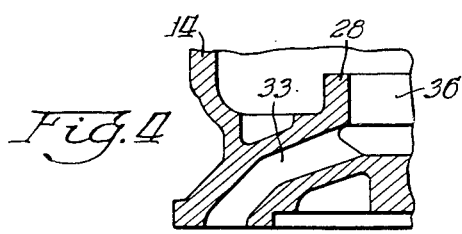
Inventor:
John R. Howe
By: Joseph R. Dwyer
Atty.

2,772,373
MOTOR THRUST LOAD BALANCING MEANS

John R. Howe, Novelty, Ohio, assignor to Borg-Warner Corporation, Chicago, Ill., a corporation of Illinois Application April 18, 1955, Serial No. 502,069

7 Claims. (Cl. 310—90)

This invention relates to motor thrust load balancing means and has for its principal object the provision of means whereby thrust loads due to weight of rotating parts on motors operating in a substantially vertical plane are divided between more than one thrust bearing.

It has heretofore been the practice to mount motors operating in a substantially vertical plane in such a manner that all of the thrust load is impressed upon one thrust bearing, with the result that the thrust bearing has a limited life and requires replacement after a short period of time. By providing an upper thrust bearing and a lower thrust bearing together with resilient means disposed to react upon the upper thrust bearing through the motor shaft and upon the lower thrust bearing, the thrust due to weight of rotating parts of the motor may be divided, so that the upper bearing is subject to substantially one-half of the thrust and the lower bearing is subjected to substantially one-half of the thrust, and, it is therefore another object of this invention to provide means for dividing the thrust due to weight of rotating parts of a motor between an upper and a lower thrust bearing in a substantially vertically mounted motor assembly.

A further object of the invention is to provide an axially movable thrust plate mounted for rotation with the motor shaft which transmits substantially one-half the motor thrust due to weight of rotating parts to the lower thrust bearing.

Another object of the invention is to provide resilient means disposed between the motor shaft and the thrust plate for dividing the motor thrust due to weight of rotating parts and transmitting substantially one-half the motor thrust to the thrust plate and thereby to the lower thrust bearing.

A still further object of the invention is to provide, in a fuel pump driving motor, a lower thrust plate with threads, cut on the outside periphery thereof, functioning to pump fuel through the motor, thus keeping the motor immersed in the fuel until its inlet is uncovered, so that the possibility of fire is avoided.

A still further object of the invention is to provide upper and lower thrust bearings of carbon, or other material having similar properties, thus making them substantially self-lubricating thereby having the ability to withstand long periods of dry running without lubrication.

Other objects and features of the invention will become apparent from the following description and drawing in which:

Figure 1 is a longitudinal cross-section of the motor assembly taken on line 1—1 of Figure 2 and showing the thrust load balancing means;

Figure 2 is a bottom view of the motor assembly shown in Figure 1;

Figure 3 is a partial cross-sectional view taken on line 3—3 of Figure 2 looking in the direction of the arrows;

Figure 4 is a partial cross-sectional view taken on line 4—4 of Figure 2 looking in the direction of the arrows; and Figure 5 is a schematic view showing the distribution of the thrust load on the thrust bearings.

In the figures, the same reference characters are used to refer to the same parts.

Referring to the drawing, there is shown a substantially vertically mounted motor assembly, generally indicated at 10, including an electric motor 11, the details of which are not shown as they form no part of this invention, having a shaft 12 contained in a housing comprising an upper part 13 and a lower part 14. The housing parts are retained in assembled relationship by means, such as bolts 15.

The upper part 13 of the housing is formed with a downwardly extending enlarged flanged portion 16 having an annular recess 17 formed therein and in which is received a bearing 18 of carbon or other material having like properties. The bearing 18 is of annular shape and is formed with annular grooves 19 and 20 in the top and bottom, respectively, thereof, the purpose of which will later become apparent. A reduced portion 21 of the shaft 12 passes through the bearing 18 and thrust washers 22 and 23 bearing against adjacent top and bottom faces, respectively, of the bearing 18 locating the motor shaft. The thrust washers 22 and 23 are slightly greater in diameter than the annular grooves 19 and 20, respectively, and therefore overhang the grooves, so as to prevent the scoring of the bearing faces by the edges thereof. The bearing 18 is retained in the recess 17 by means of an annular member 24 bolted or otherwise suitably connected to the housing portion 16, thus clamping the bearing in place. The shaft 12 is threaded at 25 and receives a nut 26 which bears against the upper thrust washer 22. A pin 27 or other means of locking passes through the shaft 12 and the nut 26, so as to retain the motor shaft and thrust washers 22 and 23 in their proper operating position.

The lower part 14 of the housing is formed with an upwardly extending flanged portion 28 having an inner cylindrical surface 29 and a lower outwardly extending flange portion 30 formed with openings 31 therein for the passage therethrough of bolts to fix the motor assembly to the means such as a fuel pump including a fuel supply source (not shown) with which it is associated. A passage 32 communicates from the exterior to the interior of the housing and a passage 33 (see Figure 4) communicates from the exterior of the housing to the interior of the flanged portion 28. The housing is also formed with a downwardly extending flanged portion 34 having an inwardly extending annular rim 35. The flanged portion 28 defines a chamber 36 and the flanged portion 34 defines a communicating chamber 37 (see Figures 3 and 4).

A lower bearing 38, formed of carbon, or other material having similar properties, is received in the chamber 37 and bears against the rim 35. The bearing 38 is in the shape of an annulus with a chamfered top edge 39, and a reduced portion 40 of the shaft 12 passes therethrough. An annular thrust plate 41 surrounds the reduced shaft portion 40 and is received in the chamber 36 and bears against the lower bearing 38. The thrust plate 41 is formed with an upwardly extending driving tongue 42 received in a slot 43 formed in the motor shaft 12, so that the thrust plate will rotate conjointly with the motor shaft. The thrust plate 41 is formed with a recess 44 for the reception of a coiled compression spring 45 which surrounds the reduced portion 40 of the shaft 12 and is received between a shoulder 46, joining the peripheries of the shaft 12 and its reduced portion 40, and the bottoms of the recess 44. The thrust plate 41 is formed on its outer periphery with threads 47 and since the passage 33 communicates with the chamber 36, the threaded thrust plate functions to pump fuel to or from the interior of the housing so that the motor is kept immersed in the fuel, and as is well-known, the possibility of fire is thus avoided.

The compression spring 45 is so chosen to be partially compressed between the shoulder 46 of the shaft 12 and the bottom of the recess 44 in the thrust plate. It must not be compressed to its solid height and it should not be compressed to the extent where it will not effectively perform its function when the thrust load varies during operation of the motor. Since the spring 45 is compressed to some extent it will react upwardly and downwardly against the shaft 12 and the thrust plate 41, respectively, to substantially divide the thrust load between the upper and lower thrust bearings. The upward reaction of the spring 45 is effective to reverse a portion of the thrust load thereby reducing the thrust on the upper thrust bearing to substantially one-half the total thrust due to rotating weight of parts. The downward reaction of the spring 45 is effective to transmit the remaining substantially one-half of the thrust to the thrust plate 41 and thereby to the lower thrust bearing.

As is obvious from the foregoing description, the thrust plate 41 is axially movable with respect to the motor shaft 12, its position depending upon the thrust transmitted thereto, and rotatable therewith and is relatively rotatable with respect to the housing.

The upper part 13 of the housing has a vent plug 48, of well-known construction, disposed therein, for providing an escape of fuel vapors from the motor housing, so as to prevent an explosion within the housing from passing from the chamber in which the motor is mounted.

The passage 32 formed in the lower part 14 of the housing functions as a passage for motor leads. The passage 33 functions as an inlet for fuel to the interior of the motor housing.

Figure 5 of the drawing shows schematically the thrust distribution of the thrust of the motor rotating assembly to the thrust surfaces of the upper and lower bearings 18 and 38, respectively, and as may be seen therefrom, the particular structure of this invention provides for substantially equal division of the thrust to the two thrust bearings.

It is understood that this invention is not to be limited to the specific constructions and arrangements shown and described, except only insofar as the claims may be so limited, as it will be understood to those skilled in the art that changes may be made without departing from the principles of the invention.

I claim:

1. In a substantially vertically mounted motor assembly including a housing defining a motor chamber; a motor mounted in said chamber, a motor shaft having a shoulder formed therein adjacent the bottom of said housing, said shaft extending from said housing at the top and bottom thereof; an upper annular carbon thrust bearing having annular groove defining means in the top and bottom surfaces thereof, surrounding said shaft fixedly retained in said housing adjacent the top thereof; annular thrust washers contacting the top and bottom surfaces of said upper thrust bearing of a diameter to overhang said groove defining means so as to prevent the scoring of said surfaces by the edges of said washers; a lower annular carbon thrust bearing surrounding said shaft fixedly retained in said housing adjacent the bottom thereof; an annular thrust plate surrounding said shaft and received in an annular opening in said housing adjacent said lower thrust bearing; and a coiled compression spring disposed around said shaft between said shaft shoulder and said thrust plate effective to react against said shoulder and thereby to said upper thrust bearing, and against said thrust plate and thereby to said lower thrust bearing to divide the thrust of the rotor of said motor between said thrust bearings, so that each of said thrust bearings is subjected to substantially one-half the thrust of said motor.

2. In a substantially vertically mounted motor assembly associated with a fluid pump and a source of fluid supply; a housing defining a motor chamber; a motor mounted in said chamber having its shaft extending from the top and bottom of said housing; upper and lower thrust bearings surrounding said shaft fixedly retained in said housing adjacent the top and bottom thereof; passage defining means communicating with said fluid supply and said chamber adjacent the bottom of said housing; and an annular thrust plate bearing on said lower thrust bearing surrounding and rotatable with said shaft disposed in said passage defining means and having a threaded outer periphery effective to pump fluid into and out of said housing so as to immerse said motor in said fluid.

3. In a substantially vertically mounted motor assembly as recited in claim 2, wherein said thrust bearings comprise annular carbon members; and resilient means disposed between said thrust bearings effective to substantially divide the thrust of the rotor of said motor between said thrust bearings.

4. In a substantially vertically mounted motor assembly associated with a fluid pump and a source of fluid supply; a housing defining a motor chamber; a motor mounted in said chamber and having its shaft extending from the top and bottom of said housing; an upper annular carbon thrust bearing surrounding said shaft and fixedly disposed in said housing adjacent the top thereof adapted to receive substantially one-half the thrust of said motor; a lower annular carbon thrust bearing surrounding said shaft and fixedly disposed in said housing adjacent the bottom thereof adapted to receive the other substantially one-half the thrust of the rotor of said motor; passage defining means communicating with said fluid supply and said chamber adjacent the bottom of said housing; an annular thrust plate bearing on said lower thrust bearing surrounding and rotatable with said shaft disposed in said passage defining means and having a threaded outer periphery effective to pump fluid into and out of said chamber so as to immerse said motor in said fluid; and a coiled compression spring surrounding said shaft disposed between said upper thrust bearing and said thrust plate effective to react upwardly against said upper thrust bearing, and downwardly against said thrust plate and thereby against said lower thrust bearing, so as to substantially divide the thrust of the rotor of said motor between said thrust bearings.

5. In a substantially vertically mounted motor assembly as recited in claim 4, wherein said thrust plate is axially movable with respect to said shaft and is rotatably connected to said shaft by means of a tongue received in a groove defining means in said shaft.

6. In a substantially vertically mounted motor assembly associated with a fluid pump and a source of fluid supply; a housing defining a motor chamber; a motor mounted in said chamber and having its shaft extending from the top and bottom of said housing, said shaft having a groove defining means therein and a shoulder formed therein adjacent the bottom of said housing; upper and lower carbon thrust bearings surrounding said shaft fixedly disposed in said housing adjacent the top and bottom thereof, respectively, each adapted to be subjected to substantially one-half the thrust of the rotor of said motor; passage defining means communicating with said fluid supply and said chamber adjacent the bottom of said housing; an annular thrust plate bearing on said lower thrust bearing surrounding said shaft disposed in said passage defining means, said thrust plate having a tongue cooperable with said groove defining means thereby forming a driving connecting between said thrust plate and said shaft and being axially movable with respect to said shaft, said thrust plate also having a threaded outer periphery adapted to pump fluid into and out of said chamber so as to immerse said motor in said fluid; and a coiled compression spring surrounding said shaft disposed between said shoulder and said thrust plate effective to react upwardly against said shoulder and thereby against said upper thrust bearing, and downwardly against said thrust plate and thereby to said lower thrust bearing, so as to substantially divide the rotor thrust between said bearings.

7. In a substantially vertically mounted assembly associated with a source of fluid supply; a housing defining a chamber; rotatable means mounted in said chamber having its shaft extending from the top and bottom of said housing; upper and lower thrust bearing means surrounding said shaft fixedly retained in said housing adjacent the top and bottom thereof; passage defining means communicating with said fluid supply and said chamber adjacent the bottom of said housing; and means bearing on said lower thrust bearing means surrounding and rotatable with said shaft disposed in said passage defining means and being so constructed and arranged to be effective to pump fluid into and out of said housing so as to immerse said rotatable means in said fluid.

References Cited in the file of this patent
UNITED STATES PATENTS

| | | |
|---|---|---|
| 633,475 | Northam | Sept. 19, 1899 |
| 1,421,082 | Hall | June 27, 1922 |
| 2,436,939 | Schug | Mar. 2, 1948 |
| 2,557,075 | Caputo | June 19, 1951 |